(12) United States Patent
Takeda et al.

(10) Patent No.: US 8,161,390 B2
(45) Date of Patent: Apr. 17, 2012

(54) APPARATUS FOR DISPLAYING FORMATION OF NETWORK

(75) Inventors: Fumiteru Takeda, Hamamatsu (JP);
Takaaki Muto, Hamakita (JP)

(73) Assignee: Yamaha Corporation, Hamamatsu-shi (JP)

( * ) Notice: Subject to any disclaimer, the term of this patent is extended or adjusted under 35 U.S.C. 154(b) by 1130 days.

(21) Appl. No.: 11/068,690

(22) Filed: Feb. 28, 2005

(65) Prior Publication Data
US 2005/0212802 A1 Sep. 29, 2005

(30) Foreign Application Priority Data

Mar. 9, 2004 (JP) ................................. 2004-065740
Mar. 9, 2004 (JP) ................................. 2004-065749

(51) Int. Cl.
*G06F 15/177* (2006.01)
(52) U.S. Cl. ......... 715/735; 715/736; 715/771; 715/808
(58) Field of Classification Search .................. 715/727, 715/734–738, 771–772, 733, 808
See application file for complete search history.

(56) References Cited

U.S. PATENT DOCUMENTS

| | | | | |
|---|---|---|---|---|
| 4,914,568 A | * | 4/1990 | Kodosky et al. ............... | 715/763 |
| 5,313,574 A | | 5/1994 | Beethe | |
| 5,377,318 A | * | 12/1994 | Wolber .......................... | 715/809 |
| 5,390,138 A | * | 2/1995 | Milne et al. .................... | 381/119 |
| 5,467,288 A | | 11/1995 | Fasciano et al. | |
| 5,481,741 A | * | 1/1996 | McKaskle et al. ............. | 345/522 |
| 5,590,271 A | * | 12/1996 | Klinker .......................... | 715/763 |
| 5,627,955 A | * | 5/1997 | Gnirss et al. .................. | 345/441 |
| 5,634,093 A | * | 5/1997 | Ashida et al. ................. | 345/443 |
| 5,801,942 A | * | 9/1998 | Nixon et al. .................... | 700/83 |
| 5,831,610 A | * | 11/1998 | Tonelli et al. ................. | 715/735 |
| 5,847,953 A | * | 12/1998 | Sojoodi et al. ................. | 700/83 |
| 5,861,882 A | * | 1/1999 | Sprenger et al. .............. | 715/700 |

(Continued)

FOREIGN PATENT DOCUMENTS

EP 1 117 226 A2 7/2001

(Continued)

OTHER PUBLICATIONS

Fujimoto, K. (Mar. 4, 2004). "135: New Strategy of the Second-Generation mLAN Heard," Yamaha Digital Library, located at <http://www.watch.impress.co.jp/av/docs/20040304/da1135.html>, 11 pages.

(Continued)

*Primary Examiner* — Alvin Tan
*Assistant Examiner* — William Wong
(74) *Attorney, Agent, or Firm* — Morrison & Foerster LLP

(57) ABSTRACT

A display apparatus is designed for displaying formation of a network on a screen. The network is composed of a plurality of nodes and is capable of transferring either of musical performance information and an audio signal through communication paths connecting the plurality of the nodes. In the display apparatus, an acquiring section acquires a type of each node and an arrangement of the communication paths arranged among the nodes for transmitting and receiving the musical performance information and the audio signal. An allocating section allocates a display area to each node within the screen according to the acquired type of each node. A drawing section draws a plurality of index images indicating the respective nodes on the screen at the display areas allocated to the respective nodes, and draws lines connecting the displayed index images of the nodes on the screen according to the acquired arrangement of the communication paths.

2 Claims, 11 Drawing Sheets

U.S. PATENT DOCUMENTS

| | | | | |
|---|---|---|---|---|
| 5,883,621 A * | 3/1999 | Iwamura | | 725/37 |
| 5,892,507 A * | 4/1999 | Moorby et al. | | 715/205 |
| 5,959,610 A | 9/1999 | Silfvast | | |
| 6,112,015 A * | 8/2000 | Planas et al. | | 709/223 |
| 6,331,864 B1 * | 12/2001 | Coco et al. | | 715/763 |
| 6,332,159 B1 * | 12/2001 | Hatae et al. | | 709/224 |
| 6,359,632 B1 | 3/2002 | Eastty et al. | | |
| 6,366,300 B1 * | 4/2002 | Ohara et al. | | 715/771 |
| 6,377,962 B1 * | 4/2002 | Tindell et al. | | 715/202 |
| 6,421,692 B1 * | 7/2002 | Milne et al. | | 715/202 |
| 6,441,830 B1 | 8/2002 | Duvall et al. | | |
| 6,473,797 B1 * | 10/2002 | Hirasawa | | 709/224 |
| 6,492,999 B1 * | 12/2002 | Fado et al. | | 715/727 |
| 6,564,112 B1 * | 5/2003 | Factor | | 700/97 |
| 6,640,145 B2 | 10/2003 | Hoffberg et al. | | |
| 6,694,198 B2 | 2/2004 | Takaku et al. | | |
| 6,721,818 B1 * | 4/2004 | Nakamura | | 710/9 |
| 6,738,964 B1 | 5/2004 | Zink et al. | | |
| 6,754,885 B1 * | 6/2004 | Dardinski et al. | | 717/113 |
| 6,775,712 B2 * | 8/2004 | Sakai et al. | | 709/249 |
| 6,784,902 B1 * | 8/2004 | Melder et al. | | 715/771 |
| 6,801,957 B1 * | 10/2004 | Sadanaka et al. | | 710/16 |
| 6,825,858 B2 * | 11/2004 | Sato | | 715/735 |
| 6,826,632 B1 * | 11/2004 | Wugofski | | 710/8 |
| 6,834,374 B1 * | 12/2004 | Sameshima | | 715/736 |
| 6,981,208 B2 * | 12/2005 | Milne et al. | | 715/203 |
| 7,024,631 B1 * | 4/2006 | Hudson et al. | | 715/763 |
| 7,168,049 B2 * | 1/2007 | Day | | 715/835 |
| 2001/0021188 A1 * | 9/2001 | Fujimori et al. | | 370/389 |
| 2001/0052946 A1 * | 12/2001 | Sato | | 348/706 |
| 2002/0003548 A1 * | 1/2002 | Krusche et al. | | 345/736 |
| 2002/0080181 A1 * | 6/2002 | Razdow et al. | | 345/772 |
| 2002/0089531 A1 * | 7/2002 | Hirasawa | | 345/735 |
| 2002/0089549 A1 * | 7/2002 | Munro et al. | | 345/835 |
| 2002/0175931 A1 | 11/2002 | Holtz et al. | | |
| 2002/0188364 A1 * | 12/2002 | Ota et al. | | 700/94 |
| 2003/0025735 A1 * | 2/2003 | Polgar et al. | | 345/771 |
| 2003/0034998 A1 * | 2/2003 | Kodosky et al. | | 345/736 |
| 2003/0035006 A1 | 2/2003 | Kodosky et al. | | |
| 2003/0046657 A1 * | 3/2003 | White | | 717/105 |
| 2004/0028247 A1 * | 2/2004 | Aiso et al. | | 381/119 |
| 2004/0032429 A1 * | 2/2004 | Shah et al. | | 345/771 |
| 2004/0261029 A1 * | 12/2004 | Skjaervik | | 715/734 |
| 2005/0060438 A1 * | 3/2005 | Drewes et al. | | 710/10 |

FOREIGN PATENT DOCUMENTS

| | | |
|---|---|---|
| JP | 7168575 | 7/1995 |
| JP | 2001-203732 | 7/2001 |
| JP | 2003-319450 | 11/2003 |

OTHER PUBLICATIONS

Notification of Reasons for Refusal mailed Mar. 17, 2009, for JP Application No. 2004-065740, eight pages, with English Translation.
Yamaha (Feb. 1, 2002). Owner's Manual for Digital Production Console DM2000, English version, 362 pages.
Japanese Office Action, mailed Nov. 4, 2008, for JP 2004-065749.
MLAN Patchbay Manual, Japan, Yamaha Corporation, 2000, pp. 14 and 15.

* cited by examiner

FIG.3 (a)

50 MODEL ID TABLE

| MODEL ID | CATEGORY |
|---|---|
| 0001 | COMPUTER |
| 0002 | MIXER |
| 0003 | MUSICAL INSTRUMENT |
| 0004 | MUSICAL INSTRUMENT |

FIG.3 (b)

60 CATEGORY TABLE

| CATEGORY | DISPOSAL POSITION | DRAWING COLOR |
|---|---|---|
| COMPUTER | LEFT | GREEN |
| MIXER | TOP | BLUE |
| MUSICAL INSTRUMENT | BOTTOM | ORANGE |
| INTERFACE | RIGHT | RED |
| UNKNOWN | CENTER | GRAY |

FIG.3 (c)

70 DISPLAY INFORMATION TABLE

| NODE ID | MODEL ID | DISPOSAL POSITION | DRAWING COLOR | MIDI-IN | MIDI-OUT | AUDIO-IN | AUDIO-OUT |
|---|---|---|---|---|---|---|---|
| 01 | 0001 | LEFT | GREEN | 16 | 16 | 8 | 8 |
| 02 | 0002 | RIGHT | BLUE | 16 | 16 | 16 | 16 |
| 03 | 0003 | BOTTOM | ORANGE | 16 | 16 | 0 | 0 |
| 04 | 0004 | BOTTOM | YELLOW | 16 | 16 | 8 | 8 |
| | | | | | | | |

90 MIDI COMMUNICATION PATH INFORMATION TABLE

| COMMUNICATION ORIGIN | COMMUNICATION DESTINATION |
|---|---|
| (01) (MIDI-OUT) (1) (•••) | (02) (MIDI-IN) (1) (•••) |
| (01) (MIDI-OUT) (2) (•••) | (02) (MIDI-IN) (2) (•••) |
| (01) (MIDI-OUT) (3) (•••) | NONE |
| | |

| | |
|---|---|
| (02) (MIDI-OUT) (1) (•••) | (03) (MIDI-IN) (1) (•••) |
| (02) (MIDI-OUT) (2) (•••) | (04) (MIDI-IN) (1) (•••) |
| | |

100 AUDIO COMMUNICATION PATH INFORMATION TABLE

| COMMUNICATION ORIGIN | COMMUNICATION DESTINATION |
|---|---|
| (01) (AUDIO-OUT) (1) (•••) | (02) (AUDIO-IN) (1) (•••) |
| (01) (AUDIO-OUT) (2) (•••) | (02) (AUDIO-IN) (2) (•••) |
| | |

APPARATUS FOR DISPLAYING FORMATION OF NETWORK

BACKGROUND OF THE INVENTION

1. Technical Field

The present invention relates to a network formation display apparatus and a signal path establishment apparatus suitably used for transmission and reception of Musical Instrument Digital Interface (MIDI) signals or audio signals between a plurality of networked nodes.

2. Related Art

Conventionally, the applicants propose the music LAN (mLAN, registered trademark) that constructs a local area network (LAN) comprising nodes such as a personal computer, an electronic musical instrument, a mixer, an effector, and a recorder, and freely sends and receives MIDI signals and audio signals between the nodes. The music LAN is disclosed in Japanese Non-examined Patent Publication No. 2001-203732. The music LAN complies with the IEEE1394 standard. Normally, each node is provided with two IEEE1394 ports. The IEEE1394 ports of each node are connected in a daisy chain configuration to build up a hardware connection of the music LAN.

In this specification, a term "LAN connector" is used to represent a hardware terminal used for connection between nodes and the like. A term "terminal" is used to represent a logical unit to input or output MIDI signals and audio signals. Logically "connecting" the terminals with each other enables transmission and reception of MIDI signals and audio signals between the logically connected nodes. When a MIDI signal is to be transmitted from a node A to another node B, for example, a logical connection must be established between one of MIDI output terminals of node A and one of MIDI input terminals of node B.

The technology disclosed in Japanese Non-examined Patent Publication No. 2001-203732 displays a list of terminals on a personal computer screen to present connection relationship between the terminals and to edit the connection relationship as needed. According to the technology, a user can select either "MIDI signal" or "audio signal" as the list to be displayed. The selected list is displayed in a table format comprising left and right columns. The left column lists output terminal names. The right column lists input terminal names. When a connection state is established between any of output and input terminals, these terminal names are displayed on the same row. To change the connection state, the user can move any input terminal name on the right column to the right of an intended terminal in the output terminal column based on the "drag-and-drop" manner using a mouse tool. In this manner, the output terminal and the input terminal are connected. The user can specify either of the "MIDI signal" list and "audio signal" list independently of each other.

Since the above-mentioned technology displays the connection relationship between terminals in a table format on character notation basis. Accordingly, users feel it difficult to intuitively and fast understand the connection relationship. Users also feel it cumbersome to change the connection relationship between the terminals.

In the above-mentioned technology, the user can select one of the "MIDI signals" list and the "audio signals" list. The user may change the order of nodes or terminals listed in the selected list. Then, the user may switch the display to the other of the "MIDI signals" list and the "audio signals" list. However, the other list does not reflect the change made to the previously selected list. Thus, when displaying the other list, the user cannot promptly recognize the display contents.

SUMMARY OF THE INVENTION

The present invention has been made in consideration of the foregoing. It is therefore a first object of the present invention to provide a network formation display apparatus and a signal path establishment apparatus capable of intuitively and fast understanding the connection relationship between nodes.

It is a second object of the present invention to enable fast change of the connection relationship between nodes.

It is a third object of the present invention to provide a network formation display apparatus and a program capable of displaying formation, topology, configuration or map of a network for intuitively and fast recognizing connection relationship between nodes.

To solve the above-mentioned problems and to achieve the above noted objects, the present invention has the following construction.

In a first aspect of the invention, an inventive display apparatus is designed for displaying formation of a network on a screen, the network being composed of a plurality of nodes and being capable of transferring either of musical performance information and an audio signal through communication paths connecting the plurality of the nodes. The inventive display apparatus comprises an acquiring section that acquires a type of each node and an arrangement of the communication paths arranged among the nodes for transmitting and receiving the musical performance information and the audio signal, an allocating section that allocates a display area to each node within the screen according to the acquired type of each node, and a drawing section that draws a plurality of index images indicating the respective nodes on the screen at the display areas allocated to the respective nodes, and that draws lines connecting the displayed index images of the nodes on the screen according to the acquired arrangement of the communication paths.

Preferably, the allocating section allocates different display modes to different types of the nodes and memorizes the respective display modes allocated to the respective nodes according to the acquired types of the nodes, and the drawing section draws the index images of the nodes based on the memorized display modes.

An inventive program is designed for use in a display apparatus having a processor for displaying formation of a network on a screen, the network being composed of a plurality of nodes and being capable of transferring either of musical performance information and an audio signal through communication paths connecting the plurality of the nodes. The inventive program is executable by the processor for causing the display apparatus to perform a method comprising the steps of acquiring a type of each node and an arrangement of the communication paths arranged among the nodes for transmitting and receiving the musical performance information and the audio signal, allocating a display area to each node within the screen according to the acquired type of each node, drawing a plurality of index images indicating the respective nodes on the screen at the display areas allocated to the respective nodes, and drawing lines connecting the displayed index images of the nodes on the screen according to the acquired arrangement of the communication paths.

In a second aspect of the invention, an inventive display apparatus is designed for use in configuring communication paths in a network of a plurality of nodes for transferring either of musical performance information and an audio signal among the plurality of the nodes. The inventive display apparatus comprises a displaying section that displays a first selection box of a first node on a display screen, the first selection box indicating a series of logical output terminals prepared for the first node, and that also displays a second selection box of a second node on the display screen, the second selection box indicating a series of logical input terminals prepared for the second node, an issuing section that issues a notification to either of the first node or the second node so as to logically establish a communication path between one of the output terminals of the first node and one of the input terminals of the second node, when said one of the output terminals is selected from the first selection box and said one of the input terminals is selected from the second selection box on the display screen, and a drawing section that draws a line connecting between said one of the output terminals and said one of the input terminals on the display screen, such that the drawn line corresponds to the established communication path.

Preferably, the inventive display apparatus further comprises a detecting section that detects when a number of the output terminals are consecutively selected from the first selection box and one of the input terminals is selected from the second selection box, a determining section responsive to the detecting section for determining whether or not a number of the input terminals corresponding to the selected output terminals are available within a consecutive range of the input terminals including the selected one input terminal, and a decreasing section that decreases the number of the selected output terminals to a number corresponding to an available number of the consecutive input terminals when the result of the determining by the determining section is negative, wherein the issuing section issues the notification to either of the first or second node so as to logically establish communication paths between the decreased number of the consecutive output terminals of the first node and the available number of the consecutive input terminals of the second node.

An inventive program is designed for use in a display apparatus having a processor for configuring communication paths in a network of a plurality of nodes for transferring either of musical performance information and an audio signal among the plurality of the nodes. The inventive program is executable by the processor for causing the display apparatus to perform a method comprising the steps of displaying a first selection box of a first node on a display screen, the first selection box indicating a series of logical output terminals prepared for the first node, displaying a second selection box of a second node on the display screen, the second selection box indicating a series of logical input terminals prepared for the second node, issuing a notification to either of the first node or the second node so as to logically establish a communication path between one of the output terminals of the first node and one of the input terminals of the second node, when said one of the output terminals is selected from the first selection box and said one of the input terminals is selected from the second selection box on the display screen, and drawing a line connecting between said one of the output terminals and said one of the input terminals on the display screen, such that the drawn line corresponds to the established communication path.

In a third aspect of the invention, an inventive display apparatus is designed for displaying formation of a network on a screen, the network being composed of a plurality of nodes and being capable of transferring musical performance information and an audio signal through communication paths connecting the plurality of the nodes. The inventive display apparatus comprises an acquiring section that acquires an arrangement of the communication paths arranged among the nodes for transmitting and receiving the musical performance information and the audio signal, an selecting section that selects one of the musical performance information and the audio signal to be presented on the screen, a determining section that determines a group of nodes capable of inputting and outputting the selected one of the musical performance information and the audio signal among the plurality of the nodes involved in the network, and a drawing section that draws index images indicating the respective nodes of the determined group on the screen, and that draws lines connecting the displayed index images of the nodes on the screen according to the acquired arrangement of the communication paths, such that the drawn lines correspond to the communication paths transferring the selected one of the musical performance information and the audio signal.

Preferably, the acquiring section also acquires a type of each node involved in the network, and an allocating section allocates a specific display mode to each node according to the acquired type of each node such that the drawing section draws the index image of each node in the specific display mode allocated to each node independently of whether the musical performance information is selected or the audio signal is selected.

An inventive program is designed for use in a display apparatus having a processor for displaying formation of a network on a screen, the network being composed of a plurality of nodes and being capable of transferring musical performance information and an audio signal through communication paths connecting the plurality of the nodes. The inventive program is executable by the processor for causing the display apparatus to perform a method comprising the steps of acquiring an arrangement of the communication paths arranged among the nodes for transmitting and receiving the musical performance information and the audio signal, selecting one of the musical performance information and the audio signal to be presented on the screen, determining a group of nodes capable of inputting and outputting the selected one of the musical performance information and the audio signal among the plurality of the nodes involved in the network, drawing index images indicating the respective nodes of the determined group on the screen, and drawing lines connecting the displayed index images of the nodes on the screen according to the acquired arrangement of the communication paths, such that the drawn lines correspond to the communication paths transferring the selected one of the musical performance information and the audio signal.

As mentioned above, the present invention allocates the display area for each type of nodes to display a node index image and to display a connection line between the node index images. The present invention makes it possible to intuitively and fast recognize the connection relationship between nodes. Further, the present invention makes it possible to fast change the connection relationship according to the construction that selects and connects terminals in the first and second selection boxes. Moreover, the present invention draws, in a display screen, a plurality of node index images and connection lines connecting the node index images with each other based on a communication path of a selected signal. The present invention can uniformly configure the display state independently of signal types. The present invention makes it possible to intuitively and fast recognize the connection relationship between nodes.

BRIEF DESCRIPTION OF THE DRAWINGS

FIGS. 3(a) through 3(e) are diagrams showing data structures according to the embodiment.

DETAILED DESCRIPTION OF THE INVENTION

1. Hardware Configuration of an Embodiment

Figure 1:
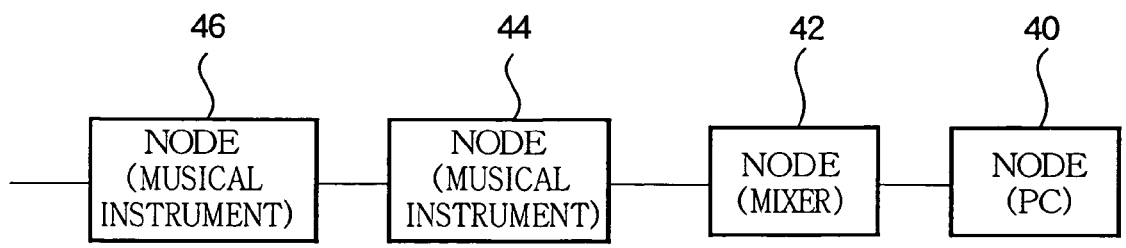
FIG. 1 is a block diagram showing a musical sound signal editing system as an embodiment of the present invention.

With reference to FIG. 1, the following describes the configuration of a musical sound signal editing system as an embodiment of the present invention.

In FIG. 1, the reference numeral 40 denotes a personal computer; 42 denotes a mixer; and 44 and 46 denote musical instruments constituting nodes on a music LAN. Each node is provided with at least two IEEE1394 ports which are connected in a daisy chain configuration. In addition to the nodes 40 through 46 in FIG. 1, it is assumed that a plurality of nodes are likewise connected to the music LAN. All the nodes are classified into any of "categories" such as "computer", "mixer", "musical instrument", "interface", and "unknown" according to their types.

Figure 2:
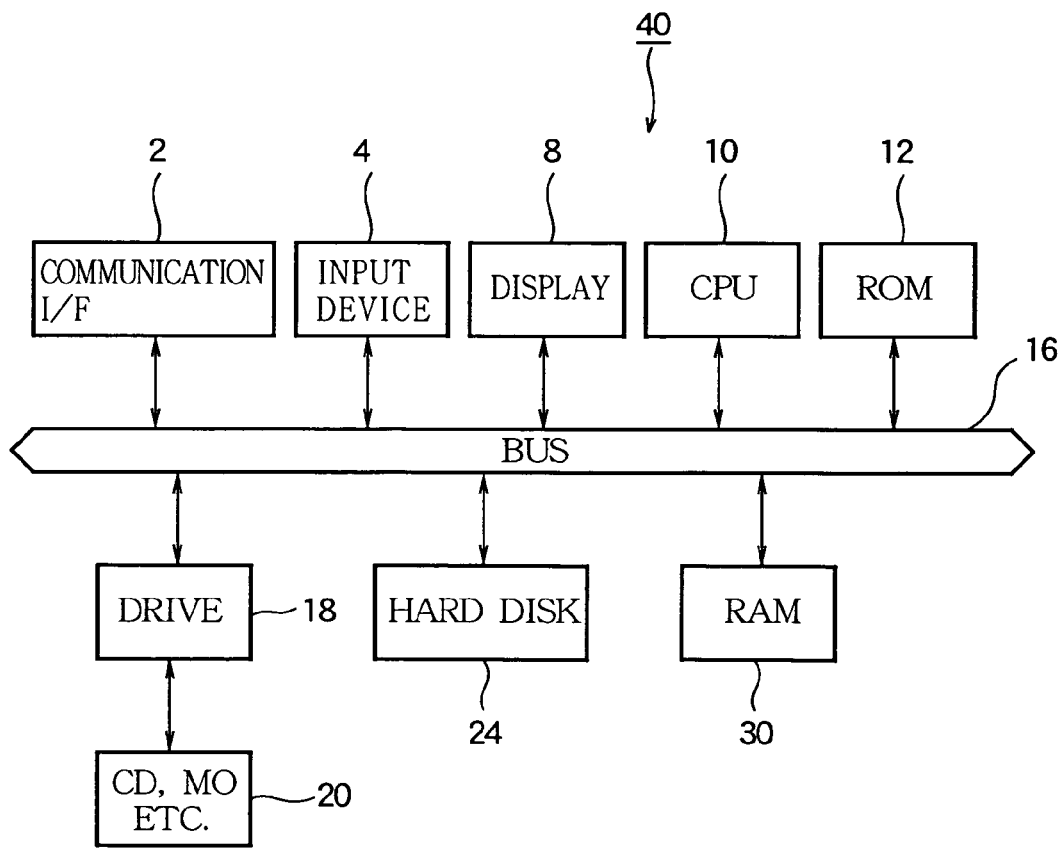
FIG. 2 is a block diagram showing a personal computer involved in the system.

The configuration of the personal computer 40 is described with reference to FIG. 2. The reference numeral 2 denotes a communication interface and is provided with the above-mentioned two IEEE1394 ports and MIDI terminals. The reference numeral 4 denotes an input apparatus comprising a keyboard, a mouse, and the like for character input. The reference numeral 8 denotes a display that displays various information for users. The reference numeral 10 denotes a central processing unit (CPU) that controls the other components via a bus 16 based on a program to be described. The reference numeral 12 denotes read-only memory (ROM) that stores an initial program loader and the like. The reference numeral 18 denotes a removable disk drive that reads data from or writes data to a removable disk 20 such as compact-disc read-only memory (CD-ROM) and a magneto-optical disc (MO). The reference numeral 24 denotes a hard disk that stores an operating system, music LAN control software, musical performance information typically MIDI data, audio signals, typically pulse-code modulation (PCM) signals, and the like. The reference numeral 30 denotes random access memory (RAM) used as work memory for the CPU 10.

2. Display Screen

Figure 4:
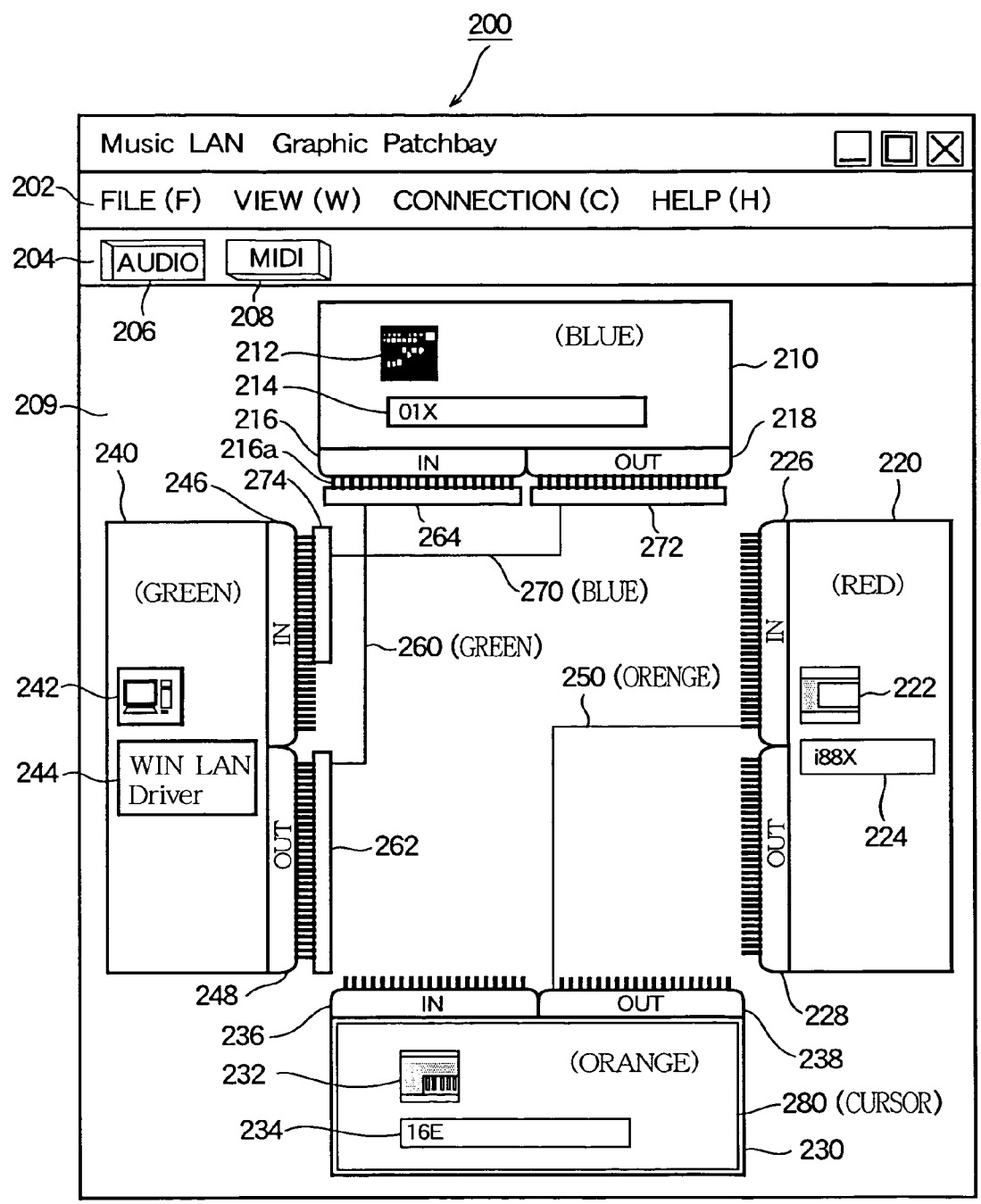
FIG. 4 is a diagram showing a display example of a patch bay window.

Referring now to FIG. 4, the following describes a display example of a patchbay window 200 displayed by music LAN control software on a display 8. Unlike the configuration in FIG. 1, the example in FIG. 4 assumes one node belonging to each of the categories "computer", "mixer", "musical instrument", and "interface". In FIG. 4, the reference numeral 202 denotes a menu bar and 204 denotes a toolbar. The toolbar 204 is provided with an audio button 206 and a MIDI button 208. The button 206 or 208 selectively turns on each time it is clicked by the mouse. Either button allows selection from "audio" and "MIDI" as the signal type whose connection state should be displayed in a field section 209. The example in FIG. 4 shows that the audio button 206 turns on. Accordingly, the field section 209 shows the connection state of audio signals.

The reference numerals 210, 220, 230, and 240 represent approximately rectangular node blocks that are displayed correspondingly to respective nodes on the music LAN. According to the corresponding node categories, the node blocks are assigned with predetermined disposal positions in the field section 209 and drawing colors (background colors in the rectangle). That is, the node block (e.g., node block 240) belonging to "computer" is displayed to the "left" and has the drawing color of "green". The node block (e.g., node block 210) belonging to "mixer" is displayed to the "top" and has the drawing color of "blue". The node block (e.g., node block 23.0) belonging to "musical instrument" is displayed to the "bottom" and has the drawing color of "orange". The node block (e.g., node block 220) belonging to "interface" is displayed to the "right" and has the drawing color of "red". Though not shown in FIG. 4, the node block belonging to "unknown" is displayed at the "center" and has the drawing color of "gray". When there is a plurality of node blocks to be displayed in the same disposal position, the node blocks are displayed so as not to overlap with each other. When the disposal position is "top" or "bottom", node blocks are disposed from the left to the right. When the disposal position is "right" or "left", node blocks are disposed from the top to the bottom.

Within the node block 210, the reference numeral 212 denotes an icon display section that displays an icon to represent the node feature (category). The reference numeral 214 denotes a node name display section that displays a name of the node (e.g., product name). The reference numeral 216 denotes an input terminal section that displays terminal images 216a so as to protrude outward. The terminal images 216a have the same number of terminals available for the input terminal of the corresponding node. The reference numeral 218 denotes an output terminal section that displays terminal images so as to protrude outward like the input terminal section 216. The terminal images have the same number of terminals available for the output terminal of the corresponding node.

The following describes the "number of available terminals". The product performance limits the number of input/output terminals for nodes. Users do not always need to use the maximum number of terminals. If the system displays the maximum number of terminal images corresponding to the performance of each node, the size of the patchbay window 200 increases, degrading the operability. To solve this problem, a user can define the "number of available terminals" actually used for each node, signal type, and input/output up to the maximum number of terminals. The window 200 displays the same number of terminal images as the number of available terminals. Like the node block 210, the node blocks 220, 230, and 240 also display icon display sections 222, 232, and 242, node name display sections 224, 234, and 244, input terminal sections 226, 236, and 246, and output terminal sections 228, 238, and 248.

The reference numeral 250 denotes a single-connection line. It is drawn so as to connect one output terminal image of a given node with one input terminal image of another node. The single-connection line is drawn in the same drawing color as that of the node corresponding to the output node. According to the example of FIG. 4, the single-connection line 250 is drawn so as to connect one output terminal image of the node block 230 with one input terminal image of the node block 220. Accordingly, the single-connection line 250 uses the same drawing color "orange" as that of the node block 230.

The reference numeral 260 denotes a multi-connection line. It is drawn so as to connect a plurality of contiguous output terminal images for a given node with the same number of input terminal images for another node. Rectangular terminal collectors 262 and 264 are drawn at both ends of the multi-connection line so that one side of each terminal collector connects to the input/output terminal images. The multi-connection line is also drawn in the same drawing color as that of the node corresponding to the plurality of output terminals. According to the example in FIG. 4, the multi-connection line 260 is drawn so as to connect all output terminal images of the node block 240 with all input terminal images of the node block 210. Accordingly, the multi-connection line 260 uses the same drawing color "green" as that of the node block 240. Likewise, the reference numeral 270 denotes a multi-connection line whose both ends are provided with terminal collectors 272 and 274. The multi-connection line 270 is drawn so as to connect all output terminal images for the node block 210 with the same number of input terminal images for the node block 240. The reference numeral 280 denotes a rectangular cursor that is drawn along the inside of the node block to be operated currently. The node blocks and the connection states in the patchbay window 200 are displayed so as to correspond to the contents of information stored in a display information table and a communication path information table (to be described).

3. Data Structures

The following describes structures of various data used by the music LAN control software. In FIG. 3(a), the reference numeral 50 denotes an ID table comprising a model ID column 52 and a category column 54. The model ID column 52 stores a unique model ID allocated to a model number (model) of each product that can be a node on the music LAN. The category column 54 stores the "category" to which the product belongs. The "category" to be stored is any of "computer", "mixer", "musical instrument", and "I/O (input/output device)". When the ID table 50 does not store a model, its category is assumed to be "unknown".

In FIG. 3(b), the reference numeral 60 denotes a category table that stores default display states of the above-mentioned "five" types of categories. The category table 60 comprises a category column 62 to store the categories; a disposal position column 64 to specify default disposal positions of the categories; and a drawing color column 66 to specify default drawing colors of the categories. As mentioned above with reference to FIG. 4, the contents of the category table 60 in FIG. 3 define disposal positions and drawing colors of the categories. A user can change the table contents to freely configure the default disposal positions and drawing colors of the respective categories.

In FIG. 3(c), the reference numeral 70 denotes a display information table that stores information to specify display states of the nodes in the patchbay window 200. The reference numeral 72 denotes a node ID column that stores node IDs, i.e., unique identification numbers assigned to the nodes. The reference numeral 74 denotes a model ID column that stores model IDs for the nodes. The reference numeral 76 denotes a disposal position column and 78 denotes a drawing color column. These columns store the same contents as those of the disposal position column 64 and the drawing color column 66. As mentioned above, the category table 60 specifies the default disposal positions and drawing colors for the categories. Editing the contents of the display information table 70 makes it possible to provide the respective nodes with disposal positions and drawing colors different from the default ones. FIG. 3 shows an example of editing the disposal position of the node with node ID "02" and the drawing color of the node with node ID "04". The reference numerals 80 through 86 denote columns for the number of available terminals. These columns store the number of available terminals corresponding to MIDI input terminals, MIDI output terminals, audio input terminals, and audio output terminals.

In FIG. 3(d), the reference numeral 90 denotes a MIDI communication path information table. Its communication origin column 92 stores terminal specification information that specifies MIDI output terminals for the nodes. The terminal specification information has the format of "(01)(MIDI-OUT)(1)( . . . )" as shown at the beginning of the communication origin column 92, for example. Of this character string, the beginning "(01)" specifies the corresponding node ID. The succeeding "(MIDI-OUT)" specifies the terminal type (any one of MIDI input, MIDI output, audio input, and audio output). In the MIDI communication path information table 90, the communication origin column 92 contains "(MIDI-OUT)" (MIDI output) for all the terminal types. The succeeding "(1)" specifies a terminal number in the specified terminal type for the specified terminal node. The succeeding "( . . . )" specifies the other additional information. The reference numeral 94 denotes a communication destination column. Like the communication origin column 92, the communication destination column 94 stores terminal specification information 96-99 that specifies MIDI input terminals for the nodes.

Let us assume that the terminal specification information in the communication origin column 92 and the terminal specification information in the communication destination column 94 are disposed on the same row. This state signifies that terminals specified by both information are "connected". Let us assume that one of the communication origin column 92 and the communication destination column 94 stores the terminal specification information and the other column is blank. This state signifies that the terminal associated with the terminal specification information is not connected to any other terminals. In this manner, the MIDI communication path information table 90 stores all connection states between MIDI terminals. In FIG. 3(e), the reference numeral 100 denotes an audio communication path information table having a data format similar to that of the table 90. The audio communication path information table 100 uses the terminal specification information stored in the communication origin column 102 and the communication destination column 104 to store all connection states between audio terminals.

4. Operations of the Embodiment

4.1 Initialization

The following describes operations of the embodiment. As shown in FIG. 1, LAN connectors of the respective nodes are connected in a daisy chain configuration. When each node is powered on, the music LAN is stepwise formed between the activated models. Finally, the music LAN is formed using all the devices as nodes. The music LAN (one musical sound editing system) provides each node with a unique node ID. At this time, each node may store initialization data that specifies the connection state between the node's terminal and another node's terminal. When the initialization data is stored, the node negotiates for the connection state with another node as a connection destination. When the destination node stores initialization data that specifies the same connection state, both terminals are configured to the connection state as specified in the initialization data. On the other hand, the node's initialization data may contradict the destination node's initialization data. Alternatively, the destination node may be still inactive. In these cases, the initialization data is ignored.

Figure 5:
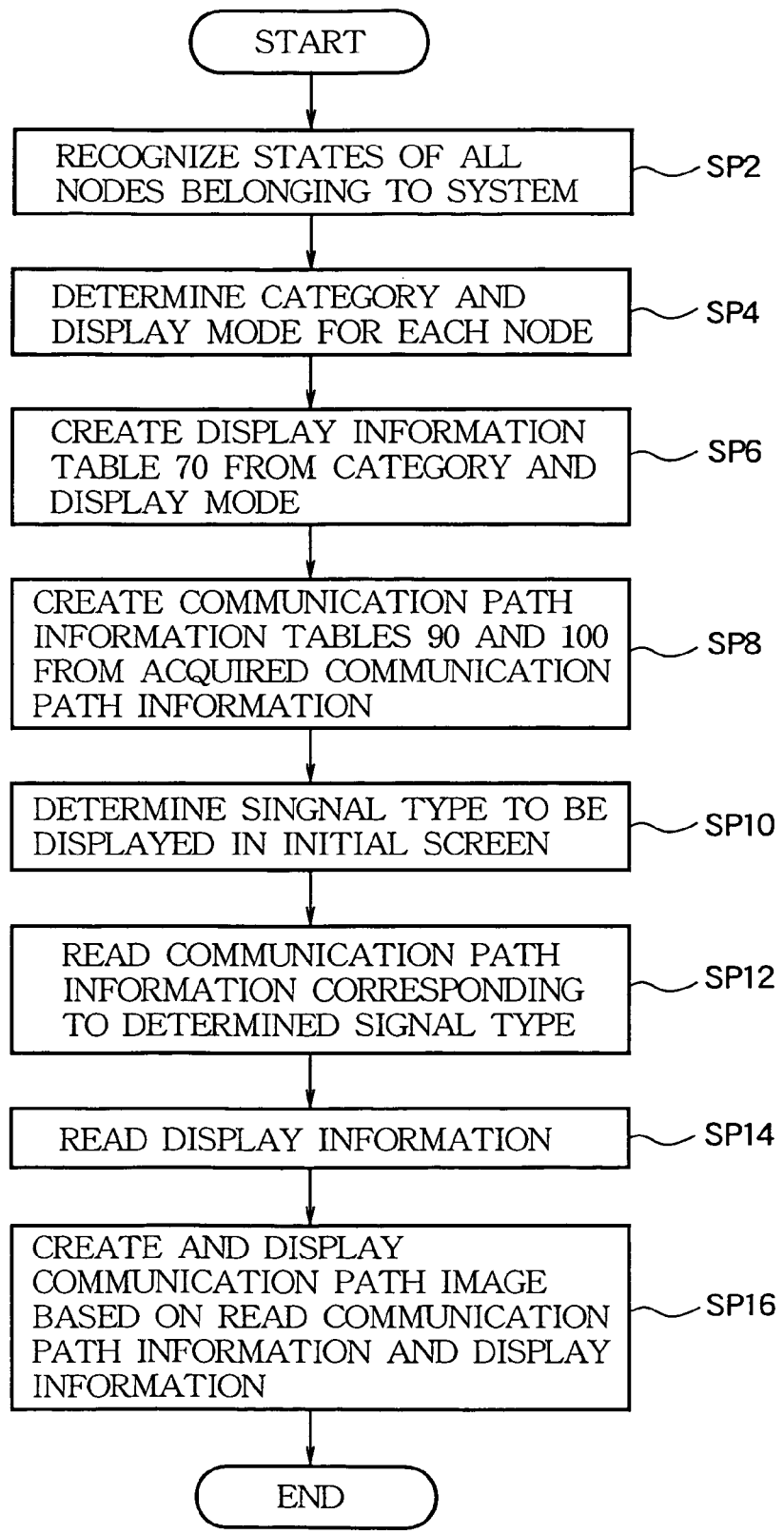
FIG. 5 is a flowchart showing the initialization routine.

When the music LAN control software starts in the personal computer 40, an initialization routine in FIG. 5 is activated. When the process proceeds to step SP2 in FIG. 5, the process acquires the contents of all nodes belonging to the music LAN. That is, the contents include the nodes' node IDs, model IDs, communication path information (e.g., connection relationship established by the initialization data), and the maximum number of input/output terminals for MIDI and audio signals. At step SP4, the process determines the nodes' categories from the model ID table 50 based on the acquired model IDs. The process determines the nodes' display states (disposal positions and drawing colors) based on the determined categories and the contents of the category table 60.

At step SP6, the process creates the display information table 70 based on the nodes' categories and the determined display states. A disposal position column 76 and a drawing color column 78 have contents as specified by the model ID table 50 and the category table 60. The columns 80 through 86 for the numbers of available terminals store the maximum numbers of input/output terminals of the nodes for MIDI and audio signals. At step SP8, the process creates the MIDI communication path information table 90 and the audio communication path information table 100 based on the communication path information acquired at step SP2. At step SP10, the process determines the signal type (audio or MIDI) to be displayed on the initial screen of the patchbay window 200. A user can predetermine the signal type to be displayed on the initial screen using a configuration file, for example.

At step SP12, the process reads the communication path information for the determined signal type from the table 90 or 100. At step SP14, the process reads the display information (disposal position, drawing color, and the maximum number of input/output terminals) about each node from the display information table 70. The maximum number of input/output terminals depends on the signal type. The disposal position and the drawing color are commonly applied irrespectively of the signal type. In this manner, the embodiment can display communication paths of the MIDI or audio signals using a consistent screen for both on the patchbay window 200.

At step SP16, the process creates the patchbay window 200 based on the read communication path information and the display information and displays the window on the display 8. Some nodes can only handle either MIDI or audio signals. In this case, the window 200 displays only information about the nodes that can handle the current signal type. The window 200 does not display information about nodes that cannot handle the signal type concerned.

4.2 Screen Changeover Event Process

Figure 6:
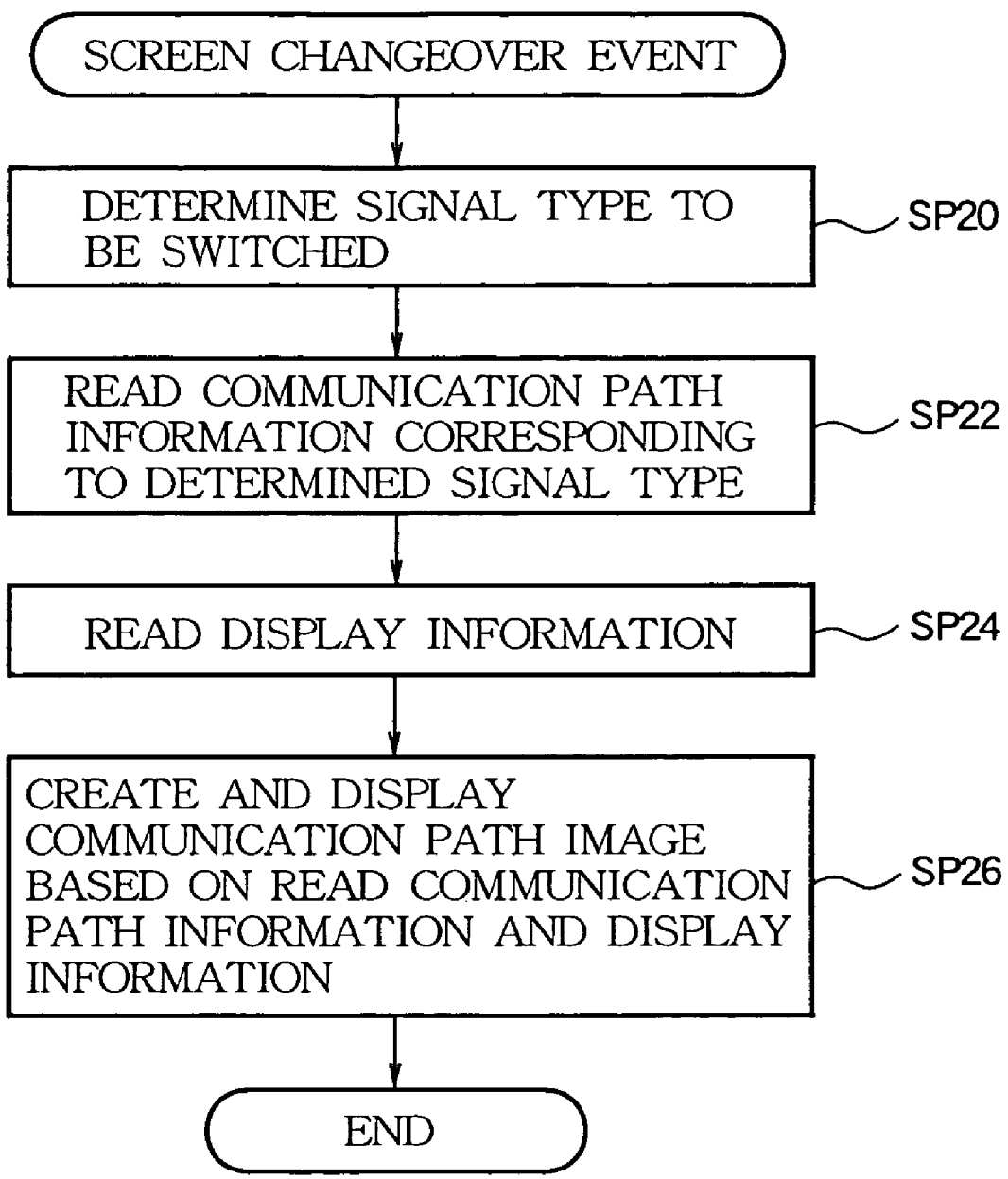
FIG. 6 is a flowchart showing the screen changeover event process routine.

In the patchbay window 200, mouse-clicking on the audio button 206 or the MIDI button 208 activates a screen changeover event process routine in FIG. 6. At step SP20, the process determines the signal type "MIDI signal" or "audio signal" to be displayed in the window 200 according to the clicked button. At step SP22, the process reads the communication path information about the MIDI communication path information table 90 or the audio communication path information table 100 corresponding to the determined signal type. At step SP24, the process reads the display information about the node to be displayed from the display information table 70. The "node to be displayed" signifies a node capable of communicating signals of the determined signal type. The "node to be displayed" applies to all nodes indicating a value greater than or equal to "1" for at least one of the number of available input terminals and the number of available output terminals associated with the signal type. At step SP26, the process updates the display state in the field section 209 based on the read communication path information and the display information so as to draw a communication path corresponding to the determined signal type.

4.3 Node Addition Event Process

The music LAN can increase nodes during operation by means of "hot plug-in". When a new node is added, a new node ID is assigned to the added node. This event is notified to the other nodes. The new node negotiates for the connection state with the other node specified as a connection destination based on initialization data stored in the new node. When the new node and the other node store the initialization data that specifies the same connection state, both node terminals are configured to the connection state as specified in the initialization data.

Figure 7:
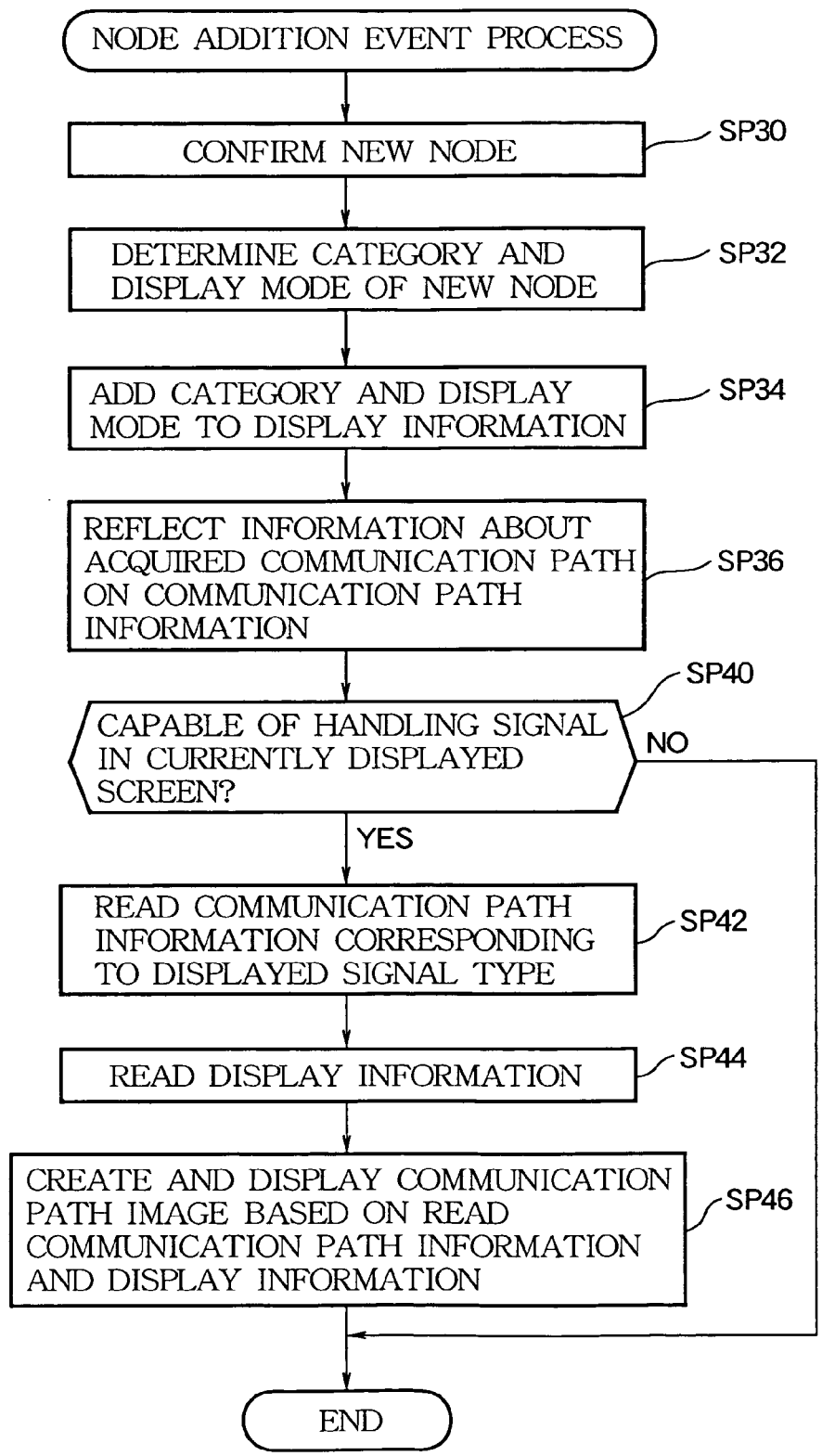
FIG. 7 is a flowchart showing the node addition event process routine.

When the new node completes the initialization process, the music LAN control software running on the personal computer 40 detects addition of the new node. The personal computer 40 starts a node addition event process routine as shown in FIG. 7. At step SP30 in FIG. 7, the process confirms the contents of the new node. That is, the process acquires the new node's node ID, model ID, communication path information, and the maximum number of input/output terminals for MIDI and audio signals. At step SP32, the process determines a category for the new node from the model ID table 50 based on the acquired model ID. Based on the determined category and the contents of the category table 60, the process determines the display state (disposal position and drawing color) of the new node. At step SP34, the process adds a record (row) corresponding to the now node to the display information table 70. The record stores the category, display state, and the maximum number of input/output terminals for various signals (i.e., initial values for the number of available terminals).

At step SP36, the process updates the contents of the MIDI communication path information table 90 and the audio communication path information table 100 so as to add the communication path information concerning the new node. At step SP40, the process determines whether or not the new node can handle the signal type (MIDI or audio) currently displayed in the window 200. When it is determined to be "NO", the routine immediately terminates without updating the window 200. The reason follows. The window 200 displays only the information related to nodes that can handle the currently displayed signal type. Adding a node incapable of handling the signal type causes no change in the display contents of the window 200.

When it is determined to be "YES" at step SP40, the process proceeds to step SP42 to read the communication path information corresponding to the signal type displayed in the window 200 from the table 90 or 100. At step SP44, the process reads the display information about the new node. At step SP46, the process updates the display contents of the window 200 based on the read communication path information and the display information. Corresponding to the new node, a node block is drawn at a position specified in the disposal position column 76 of the display information table 70 in a drawing color specified in the drawing color column

78. When any terminal of the new node is connected to a terminal of the other node, a corresponding connection line is drawn.

4.4 Display Change Event Process

Figure 8:
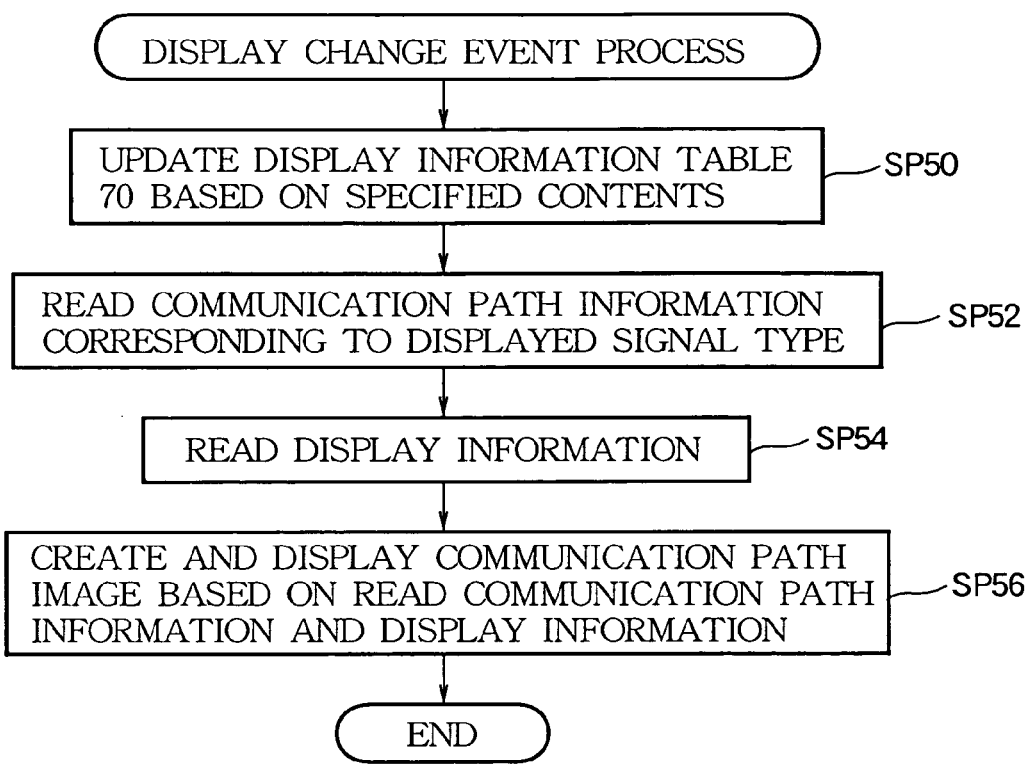
FIG. 8 is a flowchart showing the display change event process routine.

The user may perform an operation to change the disposal position or the drawing color for any node. Alternatively, the user may perform an operation to change the number of available terminals up to the maximum number of input/output terminals. In this manner, performing an operation to change the display state of the window 200 starts a display change event process routine as shown in FIG. 8. At step SP50 in FIG. 8, the process updates the contents of the display information table 70 based on the contents of the user-specified operation. At step SP52, the process reads the communication path information table 90 or 100 corresponding to the displayed signal type.

At step SP54, the process reads the contents of the display information table 70. At step SP56, the process updates the display contents of the window 200 based on the read communication path information and the display information. That is, the node blocks are redrawn with disposal positions and drawing colors based on the contents of the display information table 70. Changing the number of available terminals for a given node also changes the node block size corresponding to the number of available terminals after the change. Each connection line is also redrawn so as to follow the change in the display state of the node block.

Figure 10:
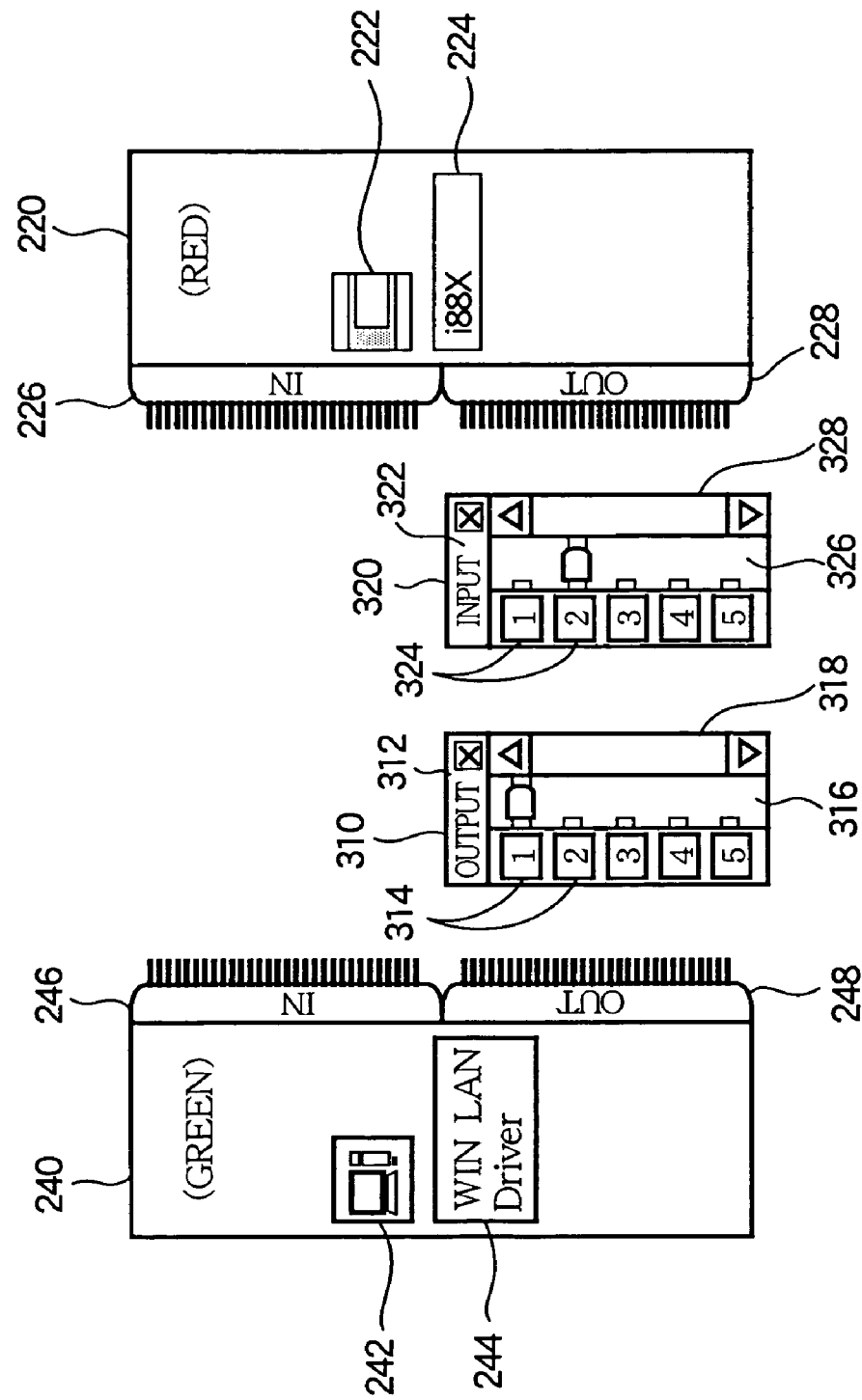
FIG. 10 is a diagram showing a display example of dialog boxes.

4.5 Changing the Connection Relationship
4.5.1 Adding a Single Connection The user can edit the connection relationship between terminals using the patchbay window 200. To add a new single connection, the user clicks on the output terminal section containing an output terminal associated with the connection. This operation displays a dialog box for selecting an output terminal near the output terminal section. In FIG. 10, for example, mouse-clicking on an output terminal section 248 of a node block 240 displays a dialog box 310 near the output terminal section 248. Within the dialog box 310, the reference numeral 312 denotes a title bar. The title bar displays "Output" to indicate that the dialog box is associated with output terminals. The drawing color of the title bar 312 matches the drawing color (green) of the corresponding node block 240. In this manner, the user can identify the dialog box 310 at a glance to determine to which category the node block belongs.

The reference numeral 314 denotes a button. When displayed, one button 314 corresponds to one output terminal belonging to the clicked output terminal section. The reference numeral 316 denotes a connection situation column indicating whether or not the output terminals are connected to any of the input terminals. The reference numeral 318 denotes a scroll bar that scrolls the buttons 314 and the connection situation column 316 up and down. Mouse-clicking on any of the buttons 314 selects the corresponding output terminal. The user cannot select an output terminal already connected to any of the input terminals. Such output terminal is ignored if clicked. To connect an input terminal to such output terminal, the user needs to previously perform a "connection removal" process to be described.

Likewise, mouse-clicking on the input terminal section containing input terminals for connection displays a dialog box for selecting an input terminal near the input terminal section. In FIG. 10, for example, mouse-click on an input terminal section 226 for a node block 220 displays a dialog box 320 near the input terminal section 226. Within the dialog box 320, the reference numeral 322 denotes a title bar. The title bar displays "Input" to indicate that the dialog box is associated with input terminals. The drawing color of the title bar 322 matches the drawing color (red) of the corresponding node block 220.

The reference numeral 324 denotes a button. When displayed, one button 324 corresponds to one input terminal belonging to the clicked input terminal section. The reference numeral 326 denotes a connection situation column indicating whether or not the input terminals are connected to any of the output terminals. The reference numeral 328 denotes a scroll bar that scrolls the buttons 324 and the connection situation column 326 up and down. Mouse-clicking on any of the buttons 324 selects the corresponding input terminal. The user cannot select an input terminal already connected to any of the output terminals. Such input terminal is ignored if clicked. To connect an output terminal to such input terminal, the user needs to previously perform the "connection removal" process to be described.

Figure 11:
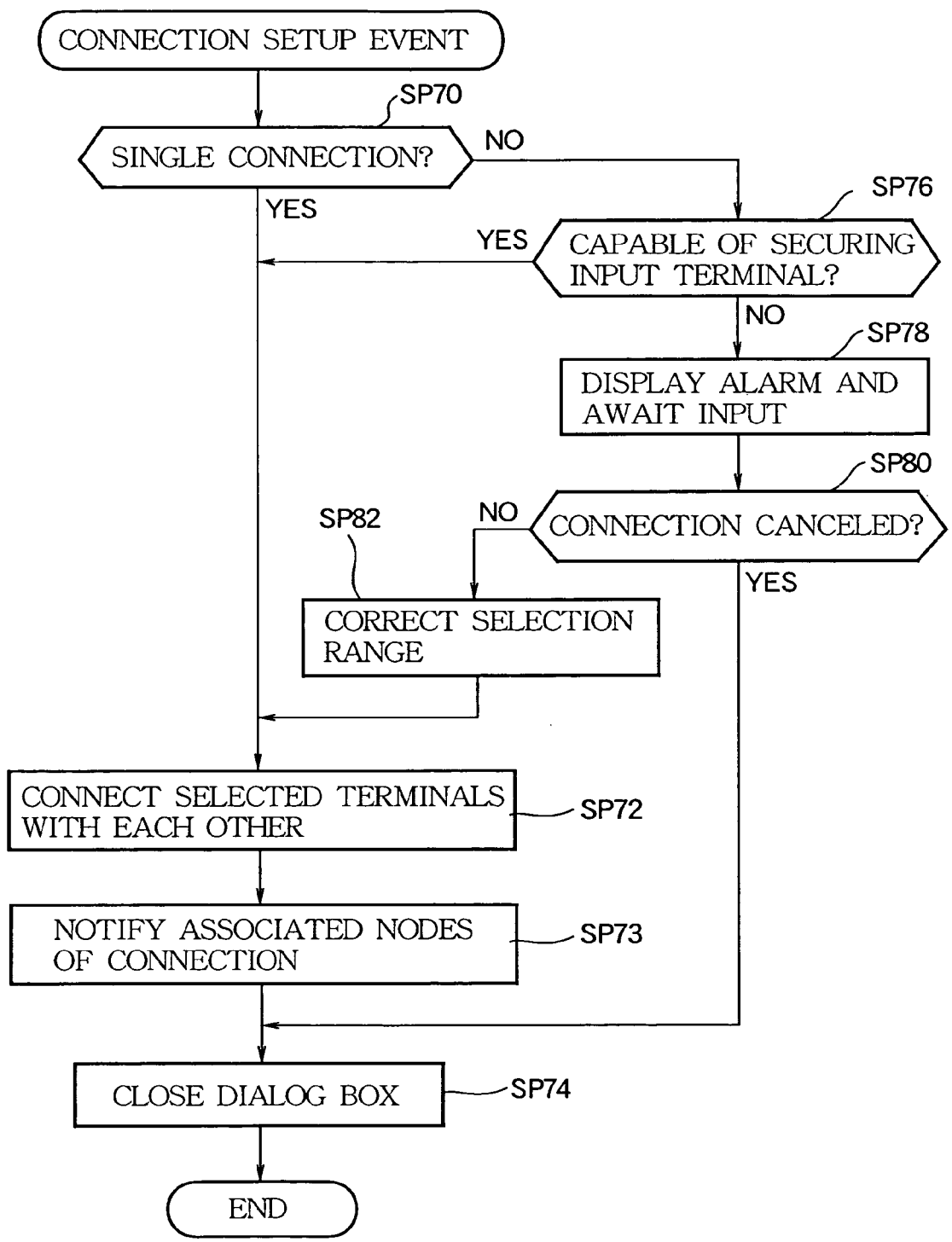
FIG. 11 is a flowchart showing the connection relationship establishment event routine.

In this manner, selecting one output terminal and then one input terminal starts a connection relationship establishment event routine in FIG. 11. At step SP70 in FIG. 11, the process determines whether or not the specified connection is "single connection". When one input terminal and one output terminal are selected as mentioned above, the connection is "single connection" and the result is assumed to be "YES". The process proceeds to step SP72. The process updates the contents of the communication path information table 90 or 100 so as to connect the selected terminals with each other. At step SP73, the process notifies the changed contents of the connection state to a node having the output terminal and the input terminal concerned. The notified node changes the connection state. At step SP74, the process closes the dialog boxes 310 and 320 to terminate the routine.

4.5.2 Adding a Plurality of Connections

Using the dialog box 310, the user can select a plurality of contiguous output terminals. For example, the user mouse-clicks on the first output terminal in a range of output terminals to be selected. Holding the "SHIFT" key on the keyboard, the user mouse-clicks on the last output terminal in the range of output terminals. These operations simultaneously select a range of output terminals to be selected. When any one of input terminals is selected in the dialog box 320, the connection relationship establishment event routine (FIG. 11) starts. In this case, a plurality of output terminals are selected. The result is assumed to be "NO" at step SP70. The process proceeds to step SP76.

The process determines whether or not to be able to ensure as many sequentially numbered input terminals as the selected output terminals in ascending order of the terminal numbers starting from the clicked input terminal. There may be a case where a value "(the number of the clicked input terminal)+(the number of selected output terminals)−1" exceeds the number of available terminals for the input terminal section. Alternatively, there may be a case where any of these input terminals is already used for the other connections. In such cases, it is assumed to be "incapable of ensuring input terminals" (NO). Otherwise, it is assumed to be "YES" at step SP76. The process proceeds to step SP72. The process updates the contents of the communication path information tables 90 and 100 so that the connection relationship is sequentially provided for the selected output terminals and the same number of input terminals starting from the clicked input terminal. Like the case of the single-connection line, at step SP73, the process notifies the changed contents of the connection state to nodes having the output terminals and the input terminals concerned. Both nodes change the connection states.

When it is determined to be "NO" at step SP76, the process proceeds to step SP78. The process notifies that no input terminal is ensured. The display 8 displays a confirmation dialog box containing a message prompting the user whether or not to establish the connection within the possible range, the "OK" button, and the "Cancel" button. The process waits until either button is operated. When the "OK" or "Cancel" button is operated, the process proceeds to step SP80 to determine whether or not the "Cancel" button is pressed. When the "Cancel" button is pressed, the process proceeds to step SP74. The process closes the confirmation dialog box and the dialog boxes 310 and 320 without changing the connection relationship between terminals.

When the "OK" button is pressed in the confirmation dialog box, the process proceeds to step SP82. The process modifies (narrows) the range of selectable output terminals to a range capable of ensuring input terminals. At step SP72, the process updates the contents of the communication path information tables 90 and 100 so that the connection relationship is sequentially provided for the output terminals within the modified selection range and the same number of input terminals starting from the clicked input terminal. At step SP73, the process notifies the changed contents of the connection state to nodes having the output terminals and the input terminals concerned. The notified nodes update the connection states. At step SP74, the process closes all dialog boxes.

4.5.3 Removing a Connection

When the user mouse-clicks any of single-connection lines or multi-connection lines displayed in the window 200, the clicked connection line is indicated with a dotted line. Pressing the "DELETE" key on the keyboard updates the contents of the communication path information table 90 or 100 so as to disconnect all input/output terminals associated with the connection line.

4.6 Communication Path Change Event Process

Figure 9:
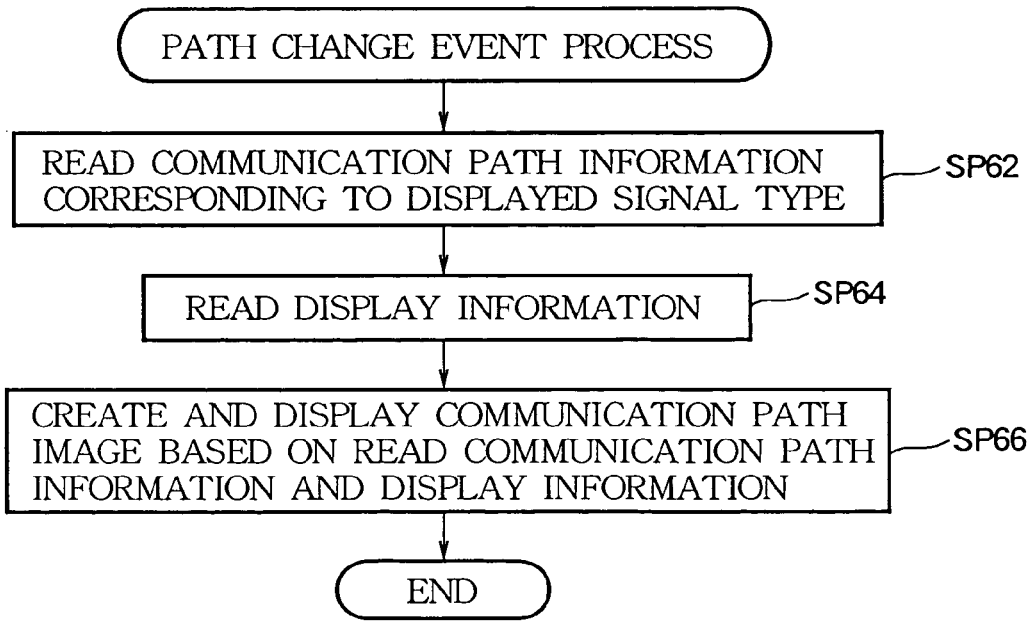
FIG. 9 is a flowchart showing the communication path change event process routine.

As mentioned above, establishing or removing a connection between terminals starts a communication path change event process routine as shown in FIG. 9. At step SP62 in FIG. 9, the process reads the communication path information table 90 or 100 corresponding to the displayed signal type. At step SP64, the process reads the contents of the display information table 70. At step SP66, the process updates the display contents of the window 200 based on the read communication path information and the display information. When a new connection is added, the corresponding connection line is added to the window 200. When a connection is removed, the corresponding connection line is deleted.

5. Modifications

The present invention is not limited to the above-mentioned embodiment and can be variously modified as will be described below.

(1) The embodiment provides default disposal positions such as "top", "bottom", "left", "right", and "center" corresponding to the node categories. Of course, the embodiment should not limit the method of defining disposal positions (display areas) for nodes in the window 200. The present invention can define various information data formats other than the embodiment.

(2) The embodiment uses "drawing color" as "display mode" to be specified for the node category. The present invention may use display modes other than the "drawing color" such as shape, pattern, and size to distinguish between categories.

(3) According to the embodiment, the patchbay window 200 displays only the nodes that can input or output signal types selected by the buttons 206 and 208. The patchbay window 200 may display all nodes independently of selection states of the signal types. In this case, it may be preferable to change the display mode in such a manner as to gray a node incapable of inputting or outputting the selected signal type.

(4) The embodiment controls various indications and nodes using the music LAN control software running on the personal computer. It is also possible to distribute only the control software stored in recording media such as CD-ROM and flexible disks or by means of a transmission path.

What is claimed is:

1. An apparatus for use in configuring communication paths in a network of a plurality of nodes for transferring either of musical performance information and an audio signal among the plurality of the nodes, the apparatus comprising:

a display;

a displaying section that displays an index image indicating a first node, a terminal section of the first node comprising a series of logical output terminals, and a first selection box of the first node on the display, the index image being separate from the first selection box, the first selection box comprising a first plurality of buttons corresponding to the series of logical output terminals prepared for the first node, the first selection box being displayed in response to a user operation on the terminal section of the first node and the first selection box providing a different view of the terminal section of the first node, wherein the displaying section also displays another index image indicating a second node, a terminal section of the second node comprising a series of logical input terminals, and a second selection box of the second node on the display, the another index image being separate from the second selection box, the second selection box comprising a second plurality of buttons corresponding to the series of logical input terminals prepared for the second node, the second selection box being displayed in response to a user operation on the terminal section of the second node and the second selection box providing a different view of the terminal section of the second node;

an issuing section that issues a notification to either of the first node or the second node so as to logically establish a communication path between one of the output terminals of the first node and one of the input terminals of the second node, when said one of the output terminals is selected using one of the first plurality of buttons from the first selection box and said one of the input terminals is selected using one of the second plurality of buttons from the second selection box on the display;

a drawing section that draws a line connecting between said one of the output terminals and said one of the input terminals on the display, such that the drawn line corresponds to the established communication path;

a detecting section that detects when a number of the output terminals are consecutively selected using more than one of the first plurality of buttons from the first selection box and one of the input terminals is selected using one of the second plurality of buttons from the second selection box;

a determining section responsive to the detecting section for determining whether or not a number of the input terminals corresponding to the selected output terminals are available within a consecutive range of the input terminals including the selected one input terminal; and a decreasing section that decreases the number of the selected output terminals to a number corresponding to an available number of the consecutive input terminals when the result of the determining by the determining section is negative, wherein the issuing section issues the notification to either of the first or second node so as to logically establish communication paths between the decreased number of the consecutive output terminals of the first node and the available number of the consecutive input terminals of the second node.

2. A recording medium storing a program for use in an apparatus having a processor for configuring communication paths in a network of a plurality of nodes for transferring either of musical performance information and an audio signal among the plurality of the nodes, the program, when executed by the processor, causing the apparatus to perform a method comprising:

displaying an index image indicating a first node, a terminal section of the first node comprising a series of logical output terminals, and a first selection box of the first node on a display, the index image being separate from the first selection box comprising a first plurality of buttons corresponding to the series of logical output terminals prepared for the first node, the first selection box being displayed in response to a user operation on the terminal section of the first node and the first selection box providing a different view of the terminal section of the first node;

displaying another index image indicating a second node, a terminal section of the second node comprising a series of logical input terminals, and a second selection box of the second node on the display, the another index image being separate from the second selection box, the second selection box comprising a second plurality of buttons corresponding to the series of logical input terminals prepared for the second node, the second selection box being displayed in response to a user operation on the terminal section of the second node and the second selection box providing a different view of the terminal section of the second node;

issuing a notification to either of the first node or the second node so as to logically establish a communication path between one of the output terminals of the first node and one of the input terminals of the second node, when said one of the output terminals is selected using one of the first plurality of buttons from the first selection box and said one of the input terminals is selected using one of the second plurality of buttons from the second selection box on the display;

drawing a line connecting between said one of the output terminals and said one of the input terminals on the display, such that the drawn line corresponds to the established communication path;

detecting when a number of the output terminals are consecutively selected using more than one of the first plurality of buttons from the first selection box and one of the input terminals is selected using one of the second plurality of buttons from the second selection box;

determining whether or not a number of the input terminals corresponding to the selected output terminals are available within a consecutive range of the input terminals including the selected one input terminal; and decreasing the number of the selected output terminals to a number corresponding to an available number of the consecutive input terminals when the result of the determining is negative, wherein the notification is issued to either of the first or second node so as to logically establish communication paths between the decreased number of the consecutive output terminals of the first node and the available number of the consecutive input terminals of the second node.

* * * * *